United States Patent
Suzuki et al.

(10) Patent No.: US 8,988,250 B2
(45) Date of Patent: Mar. 24, 2015

(54) PARKING ASSISTANT AND PARKING ASSISTING METHOD

(75) Inventors: Masayasu Suzuki, Yokohama (JP);
Takeshi Akatsuka, Yokohama (JP);
Satoshi Kawai, Yokohama (JP);
Hidenori Seguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 230 days.

(21) Appl. No.: 12/680,423

(22) PCT Filed: Sep. 24, 2008

(86) PCT No.: PCT/JP2008/067177
§ 371 (c)(1),
(2), (4) Date: Mar. 26, 2010

(87) PCT Pub. No.: WO2009/044654
PCT Pub. Date: Apr. 9, 2009

(65) Prior Publication Data
US 2010/0238051 A1 Sep. 23, 2010

(30) Foreign Application Priority Data

Oct. 1, 2007 (JP) ................................. 2007-258012
Jul. 31, 2008 (JP) ................................. 2008-197407

(51) Int. Cl.
*B60Q 1/48* (2006.01)
*B62D 15/02* (2006.01)
(Continued)

(52) U.S. Cl.
CPC .............. *B62D 15/0275* (2013.01); *B60R 1/00* (2013.01); *B62D 15/027* (2013.01);
(Continued)

(58) Field of Classification Search
CPC ................... B60R 2300/301; B60R 2300/806; B60R 2300/8093; B62D 15/027; B62D 15/0275; G06T 15/205
See application file for complete search history.

(56) References Cited

U.S. PATENT DOCUMENTS 2,955,507 A 10/1960 Ludwig
6,285,317 B1 * 9/2001 Ong .......................... 342/357.57
(Continued)

FOREIGN PATENT DOCUMENTS

EP 1 179 958 2/2002
EP 1 442 962 A2 8/2004
(Continued)

OTHER PUBLICATIONS

English translation of JP 2006-129021 A, May 18, 2006, 26 pages.
(Continued)

*Primary Examiner* — Benjamin C Lee
*Assistant Examiner* — Rajsheed Black-Childress
(74) *Attorney, Agent, or Firm* — Foley & Lardner LLP

(57) ABSTRACT

When a parking assistant assists a driver in carrying out parking operation, the parking assistant takes image of vehicle surroundings to generate vehicle surroundings images, converts coordinates of vehicle surroundings images to generate overhead view image, and sets a parking target area in the overhead view image. On the overhead view image, the parking assistant superposes a parking target area image which denotes the parking target area. The parking assistant generates the parking target area image when a first certain portion where a solid object is present is superposed with the parking target area. The parking target area image is generated in a second certain portion other than the superposed first certain portion. The generating operation is implemented even when another vehicle included in the overhead view image falls in the set parking target area image. The parking assistant displays the overhead view image and the parking target area image.

8 Claims, 11 Drawing Sheets

(51) Int. Cl.
*B60R 1/00* (2006.01)
*G06T 15/20* (2011.01)
*H04N 7/18* (2006.01)

(52) U.S. Cl.
CPC ......... *B62D 15/0285* (2013.01); *G06T 15/205* (2013.01); *H04N 7/18* (2013.01); *B60R 2300/102* (2013.01); *B60R 2300/105* (2013.01); *B60R 2300/301* (2013.01); *B60R 2300/305* (2013.01); *B60R 2300/607* (2013.01); *B60R 2300/806* (2013.01); *B60R 2300/8093* (2013.01)
USPC .................... 340/932.2; 340/995.1; 348/118; 348/148

(56) References Cited

U.S. PATENT DOCUMENTS

| | | | |
|---|---|---|---|
| 7,012,550 | B2 | 3/2006 | Iwakiri et al. |
| 7,257,486 | B2 | 8/2007 | Shimazaki et al. |
| 7,317,813 | B2* | 1/2008 | Yanagawa et al. ............. 382/104 |
| 7,592,928 | B2 | 9/2009 | Chinomi et al. |
| 7,640,107 | B2* | 12/2009 | Shimizu et al. ................ 701/523 |
| 7,734,417 | B2* | 6/2010 | Chinomi et al. ............... 701/301 |
| 7,825,828 | B2* | 11/2010 | Watanabe et al. .......... 340/932.2 |
| 2003/0004613 | A1 | 1/2003 | Hahn et al. |
| 2003/0122687 | A1 | 7/2003 | Trajkovic et al. |
| 2004/0003351 | A1 | 1/2004 | Sommerer et al. |
| 2004/0049341 | A1* | 3/2004 | Fujiwara ....................... 701/210 |
| 2004/0153243 | A1 | 8/2004 | Shimazaki et al. |
| 2004/0249564 | A1 | 12/2004 | Iwakiri et al. |
| 2005/0049767 | A1 | 3/2005 | Endo et al. |
| 2005/0143893 | A1 | 6/2005 | Takamatsu et al. |
| 2005/0285758 | A1 | 12/2005 | Matsukawa et al. |
| 2006/0080005 | A1* | 4/2006 | Lee et al. ........................... 701/1 |
| 2006/0119472 | A1* | 6/2006 | Tsuboi .......................... 340/435 |
| 2006/0235590 | A1 | 10/2006 | Bolourchi et al. |
| 2006/0274147 | A1 | 12/2006 | Chinomi et al. |
| 2006/0287825 | A1 | 12/2006 | Shimizu et al. |
| 2007/0075875 | A1 | 4/2007 | Danz et al. |
| 2007/0129863 | A1 | 6/2007 | Hsu et al. |
| 2007/0273554 | A1* | 11/2007 | Sakakibara ................ 340/932.2 |
| 2008/0077294 | A1 | 3/2008 | Danz et al. |
| 2008/0169965 | A1 | 7/2008 | Minichshofer |
| 2008/0266137 | A1 | 10/2008 | Son |
| 2009/0091475 | A1 | 4/2009 | Watanabe et al. |
| 2009/0121899 | A1* | 5/2009 | Kakinami et al. ......... 340/932.2 |

FOREIGN PATENT DOCUMENTS

| | | | |
|---|---|---|---|
| EP | 1 462 342 | A | 9/2004 |
| EP | 1 642 768 | A1 | 4/2006 |
| EP | 1 683 707 | A1 | 7/2006 |
| EP | 1 908 641 | A1 | 4/2008 |
| EP | 1 950 097 | A1 | 7/2008 |
| GB | 2 357 743 | A | 7/2001 |
| GB | 2 409 921 | A | 7/2005 |
| JP | 11-208420 | A | 8/1999 |
| JP | 2001-010427 | A | 1/2001 |
| JP | 2003-104149 | A | 4/2003 |
| JP | 2003-115100 | A | 4/2003 |
| JP | 2004-235986 | A | 8/2004 |
| JP | 2004-306814 | A | 11/2004 |
| JP | 2005-239048 | A | 9/2005 |
| JP | 2006-129021 | A | 5/2006 |
| JP | 2006-290051 | A | 10/2006 |
| JP | 2006-341641 | A | 12/2006 |
| JP | 2007-088577 | A | 4/2007 |
| JP | 2007-168560 | A | 7/2007 |
| JP | 2007-183877 | A | 7/2007 |
| JP | 2007-230371 | A | 9/2007 |
| WO | WO 2007/013489 | | 2/2007 |
| WO | WO 2007/058246 | A1 | 5/2007 |

OTHER PUBLICATIONS

English translation of JP 2007-183877 A, Jul. 19, 2007, 27 pages.
English translation of JP 2007-230371 A, Sep. 13, 2007, 42 pages.
U.S. Appl. No. 12/680,400, filed Mar. 26, 2010, Masayasu Suzuki et al.
English translation of JP 2007-168560 A, Jul. 5, 2007, 18 pages.
English translation of JP 2004-235986 A, Aug. 19, 2004, 13 pages.
English translation of JP 2007-088577 A, Apr. 5, 2007, 15 pages.
English translation of JP 2005-239048 A, Sep. 8, 2005, 20 pages.
A. Mori et al., Non-Final Office Action, U.S. Appl. No. 12/680,400, dated Nov. 26, 2012, (18 pgs.).
M. Suzuki et al., USPTO Final Office Action U.S. Appl. No. 12/680,400, dated May 8, 2013, 1 (27 pages).
M. Suzuki et al., USPTO Notice of Allowance U.S. Appl. No. 12/680,400, dated Jun. 3, 2014, (19 pages).

* cited by examiner

PARKING ASSISTANT AND PARKING ASSISTING METHOD

TECHNICAL FIELD

The present invention relates to a parking assistant and a parking assisting method. By providing a driver with an image which denotes a vehicle surroundings state, the parking assistant and the parking assisting method assist an operation of the driver to park an own vehicle in a target position.

BACKGROUND ART

Conventionally, a parking assistant is known (see Patent Literature 1) which carries out a coordinate conversion of an image of surroundings of an own vehicle which image is taken by a plurality of cameras, and thereby generates an overhead view image which is the own vehicle viewed from the sky as a virtual viewpoint. Then, on the overhead view image, the conventional parking assistant superposes a parking frame image which denotes a parking target position set by the driver, to thereby display the parking frame image. With the conventional parking assistant, as the case may be, the driver was unable to accurately obtain the parking frame, for example, in such an occasion that another vehicle is present in a parking frame adjacent to the parking frame that denotes the parking target position, since the parking frame is so displayed as to cover the other vehicle.

For solving the above problem, it is an object of the present invention to provide a parking assistant and a parking assisting method which are capable of allowing a driver to accurately obtain a parking frame when the driver parks an own vehicle in a parking target position.

[Patent Literature 1] Japanese Patent Application Laid-Open No. 2005-239048

DISCLOSURE OF INVENTION

The present invention sets a parking target area in an overhead view image generated from a vehicle surroundings image, generates a parking target area image when a first certain portion where a solid object is present is superposed, in an overhead view image, with the parking target area, the parking target area image being generated in a second certain portion other than the superposed first certain portion, and displays the generated parking target area image and overhead view image.

DESCRIPTION OF EMBODIMENTS

Figure 1:
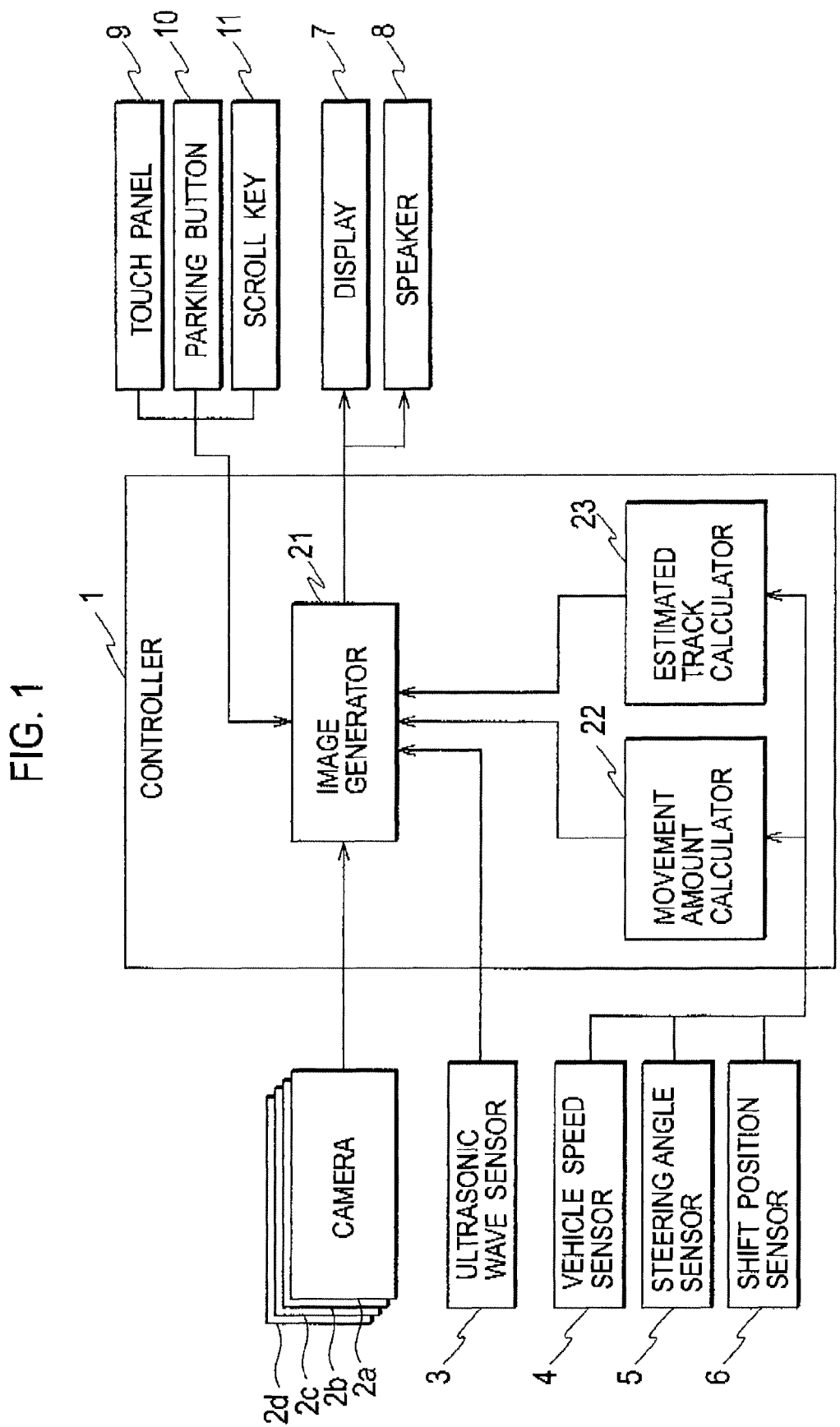
FIG. 1 is a block diagram showing a structure of a parking assistant, according to a first embodiment of the present invention.

Hereinafter, embodiments of the present invention are to be set forth, referring to the drawings.

First Embodiment

The present invention is applicable to a parking assistant having a structure, for example, shown in FIG. 1, according to a first embodiment. For assisting a driver in a parking operation of a vehicle, the parking assistant in FIG. 1 provides the driver with a vehicle surroundings state as an overhead view image.

The parking assistant in FIG. 1 includes a controller 1, cameras 2a, 2b, 2c, 2d (hereinafter simply referred to as "camera 2" when called as a generic term), and an ultrasonic wave sensor 3. The parking assistant is provided with a vehicle speed sensor 4, a steering angle sensor 5, and a shift position sensor 6. The parking assistant is provided with a display 7, a speaker 8, a touch panel 9, a parking button 10 and a scroll key 11.

The controller 1 is set in an instrument panel of the vehicle. Cameras 2a, 2b, 2c, 2d are disposed in such positions as to take images of front, rear, right and left sides of the vehicle respectively. The ultrasonic wave sensors 3 are disposed at front and rear sides of the vehicle. The panel 8, the parking button 9, the scroll key 10 and the display 7 are respectively set in positions where such members can be operated and visible from the driver.

The camera 2 includes, for example, a CCD (Charge Coupled Device) camera or a CMOS (Complementary Metal-Oxide Semiconductor) camera. To an image generator 21 of the controller 1, the camera 2 outputs the vehicle surroundings image obtained by taking vehicle surroundings images. According to the first embodiment, four cameras 2a, 2b, 2c, 2d for taking images of the front, rear, right and left sides of the vehicle respectively are provided. Therefore, the four vehicle surroundings images on front, rear, right and left sides of the vehicle can be outputted to the image generator 21 of the controller 1.

Figure 2:
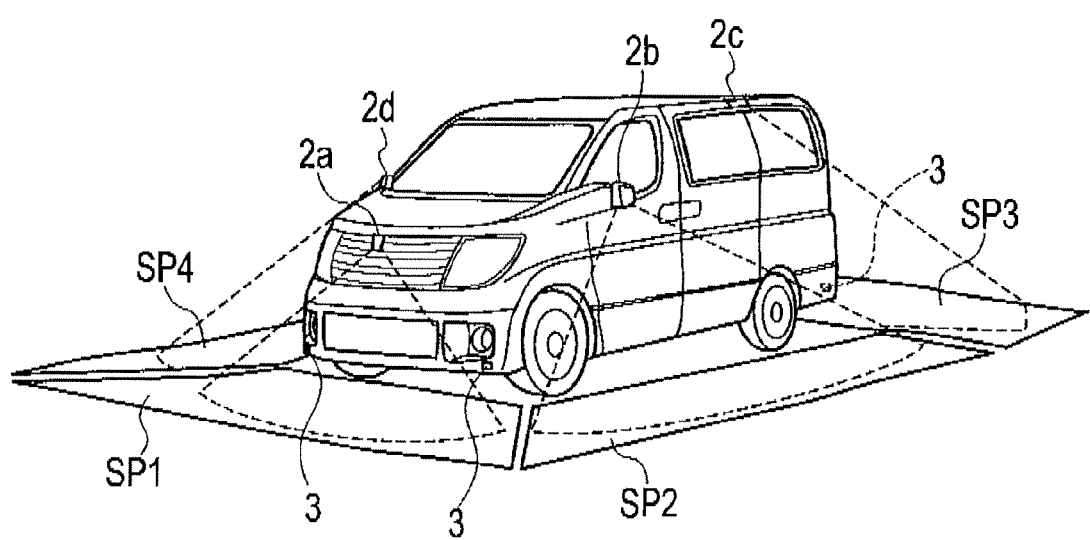
FIG. 2 is a specific example of the set positions and image-taking areas of four vehicle-mounted cameras.

The cameras 2 are respectively set on front, rear, right and left sides of the vehicle and take respective images in the four directions around the vehicle. As shown in FIG. 2, the camera 2a is set at a front grille of the vehicle, and takes an image in an image-taking area SP1 on the front side of the vehicle, the camera 2c is set at a left side mirror on the left side of the vehicle, and takes an image in an image-taking area SF2 on the left side of the vehicle, the camera 2b is set at a roof spoiler on the Tear side of the vehicle, and takes an image in an image-taking area SP3 on the rear side of the vehicle, and the camera 2d is set at a right side mirror on the right side of the vehicle, and takes an image in an image-taking area SF4 on the right side of the vehicle. The data of the vehicle surroundings images taken by the cameras 2a, 2b, 2c, 3d are supplied to the controller 1 at any time.

In total, four of the ultrasonic wave sensors 3 are set respectively at a left front, right front, left rear and right rear ends of the vehicle. The ultrasonic wave sensor 3 senses a distance from an own vehicle to an obstacle around the own vehicle, and outputs the obstacle's position information to the image generator 21 of the controller 1. Based on a period from a time point for transmitting an ultrasonic wave to a time for receiving the ultrasonic wave, the ultrasonic wave sensor 3 senses the distance between the obstacle and the own vehicle. The direction in which the obstacle is present is sensed based on which of the four ultrasonic wave sensors 3 has sensed the obstacle.

The vehicle speed sensor 4, the steering angle sensor 5 and the shift position sensor 6 each sense a behavior of the own vehicle. The vehicle speed sensor 4 senses a speed of the own vehicle. The steering angle sensor 5 senses a steeling wheel angle of the own vehicle. The shift position sensor 6 senses a shift position (gear position) of the own vehicle. The vehicle speed sensor 4, the steering angle sensor 5 and the shift position sensor 6 respectively output a vehicle speed signal, a steering angle signal and a shift position signal to a movement amount calculator 22 and an estimated track calculator 23 of the controller 1.

The display 7 provides the drive with each information for assisting the driving operation. Mainly, the display 7 displays an image (hereinafter referred to as "display image") by superposing an information image (such as parking target area) on the vehicle surroundings image. The speaker 8 outputs a guidance voice for informing the driver of the parking target area and the like. The touch panel 9 and the scroll key 11 are disposed in substantially a center position of the instrument panel of the vehicle. The parking button 10 is disposed at the instrument panel of the vehicle. The touch panel 9, the parking button 10 and the scroll key 11 are so made as to be operated by the driver.

The touch panel 9 has a touch sensor incorporated in the display 7. To the controller 1, the touch panel 9 outputs a press position (as an operation signal) in the image of the display 7. By pressing the touch panel 9, the driver can change the parking target area which is to be described afterward. Being pressed by the driver, the parking button 10 outputs a start signal (for instructing start of the parking assisting operation) to the controller 1. The driver can select one of the following four parking patterns by the parking button 10: a parallel parking in the right direction around the own vehicle, a parallel parking in the left direction around the own vehicle, a linear parking in the right direction around the own vehicle, a linear parking in the left direction around the own vehicle.

Being turned or pressed by the driver, the scroll key 11 outputs a signal to the controller 1. By turning the scroll key 11, the driver can change the parking target area which is to be described afterward. By pressing the scroll key 11, the driver can determine the parking target area which is to be described afterward.

Figure 3:
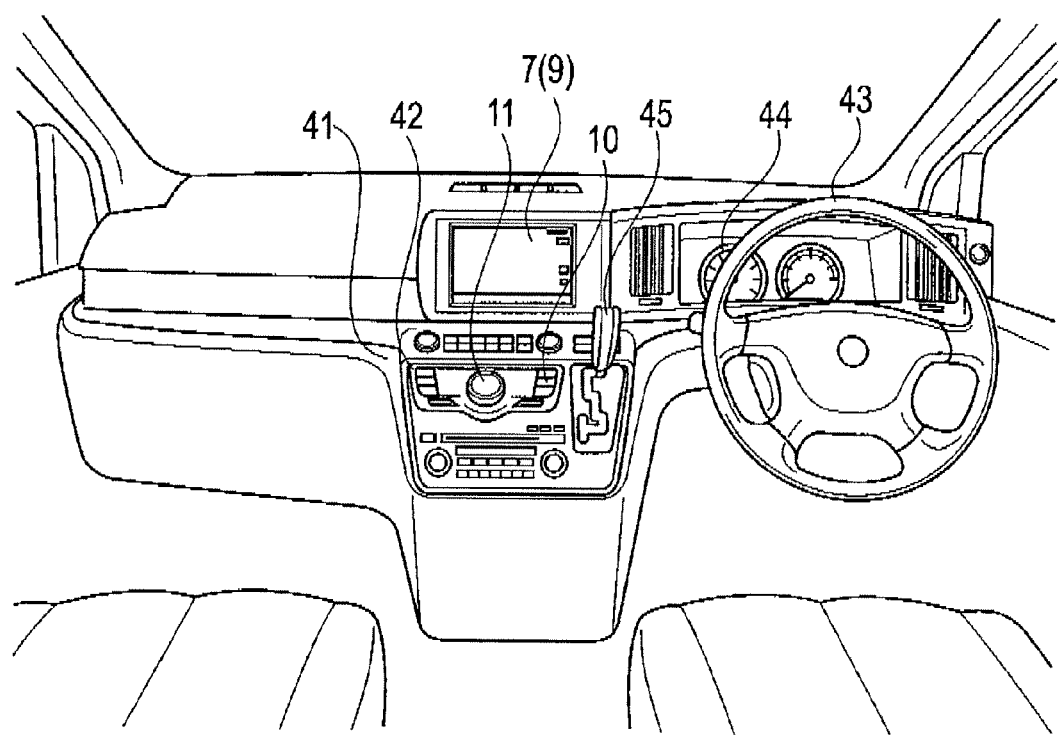
FIG. 3 is a front view showing positions of a display, a parking button and a scroll key.

Substantially in the center part of the instrument panel 41, as shown in FIG. 3, there are provided a switch group 42 (including the parking button 10 and the scroll key 11) and the display 7. On the driver's side of the instrument panel 41, a display portion 44 for displaying the vehicle speed and the engine's rpm and the like are disposed. On a steering wheel 43 side of the switch group 42, there is provided a shift lever 45. On the shift lever 45 side in the switch group 42, there is provided the parking button 10.

The controller 1 includes the image generator 21 which is connected to the cameras 2a, 2b, 2c, 2d, the ultrasonic wave sensor 3, the display 7, the speaker 8, the touch panel 9, the parking button 10 and the scroll key 11. The controller 1 has the movement amount calculator 22 and the estimated track calculator 23 which are connected to the vehicle speed sensor 4, steering angle sensor 5 and shift position sensor 6. The controller 1 includes a computer provided with CPU, ROM, RAM and the like. For convenience' sake, however, the structure of the controller 1 in FIG. 1 is to be set forth by separating the controller 1 per functional block.

By using the vehicle speed signal, the steering angle signal and the shift position signal from the vehicle speed sensor 4, the steering angle sensor 5 and the shift position sensor 6 respectively, the movement amount calculator 22 senses the movement amount of the own vehicle. Based on a tire turning angle information which is converted from the shift position signal and steering angle signal, the movement amount calculator 22 calculates a movement direction of the vehicle. Meanwhile, from the vehicle speed signal, the movement amount calculator 22 calculates the movement amount in the movement direction. The movement amount information calculated by the movement amount calculator 22 is outputted to the image generator 21.

By using the tire turning angle information converted from the steering angle signal and shift position signal outputted respectively from the steering angle sensor 5 and shift position sensor 6, the estimated track calculator 23 calculates at estimated track of the own vehicle. The estimated track information of the own vehicle is outputted to the image generator 21. By using the obstacle position information outputted from the ultrasonic wave sensor 3, the movement amount information outputted from the movement amount calculator 22 and the estimated track information outputted from the estimated track calculator 23, the image generator 21 generates a display image including information images such as the parking target area.

Figure 4:
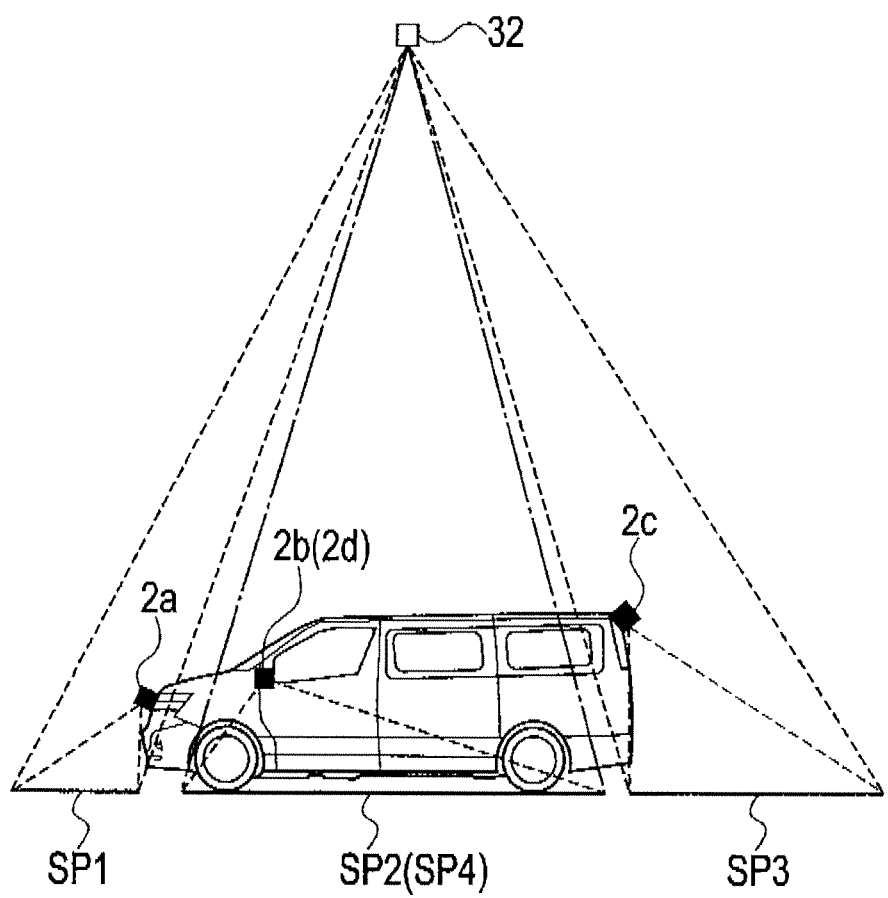
FIG. 4 shows positions of actual cameras and a virtual camera relative to the image-taking areas.

The image generator 21 carries out a coordinate conversion of each of the following four vehicle surroundings image data which are taken by the cameras 2a, 2b, 2c, 2d: a vehicle front image, a vehicle rear image, a vehicle left image, and a vehicle right image, and then synthesizes the four vehicle surroundings image data. Then, from the vehicle surroundings image data taken by the cameras 2a, 2b, 2c, 2d, the image generator 21 generates a synthesized image (overhead view image) which is taken by looking down the entire vehicle surroundings from a virtual viewpoint at the upper part of the vehicle, as shown in FIG. 4. That is, by using a conversion table describing a relation of pixel addresses on the images before and after the conversion, the image generator 21 carries out a viewpoint conversion (of the respective vehicle surroundings images taken by the cameras 2a, 2b, 2c, 2d) to the overhead view images. Then, after the viewpoint conversion, the image generator 21 joins the vehicle surroundings images. With this, the image generator 21 converts the vehicle surroundings images (taken by the camera 2) to the overhead view images (looking down the image-taking area from directly overhead in the center of the vehicle) obtained by taking the image-taking areas SP1, SP2, SP3, SP4 with a virtual camera 32 as a viewpoint.

Figure 5:
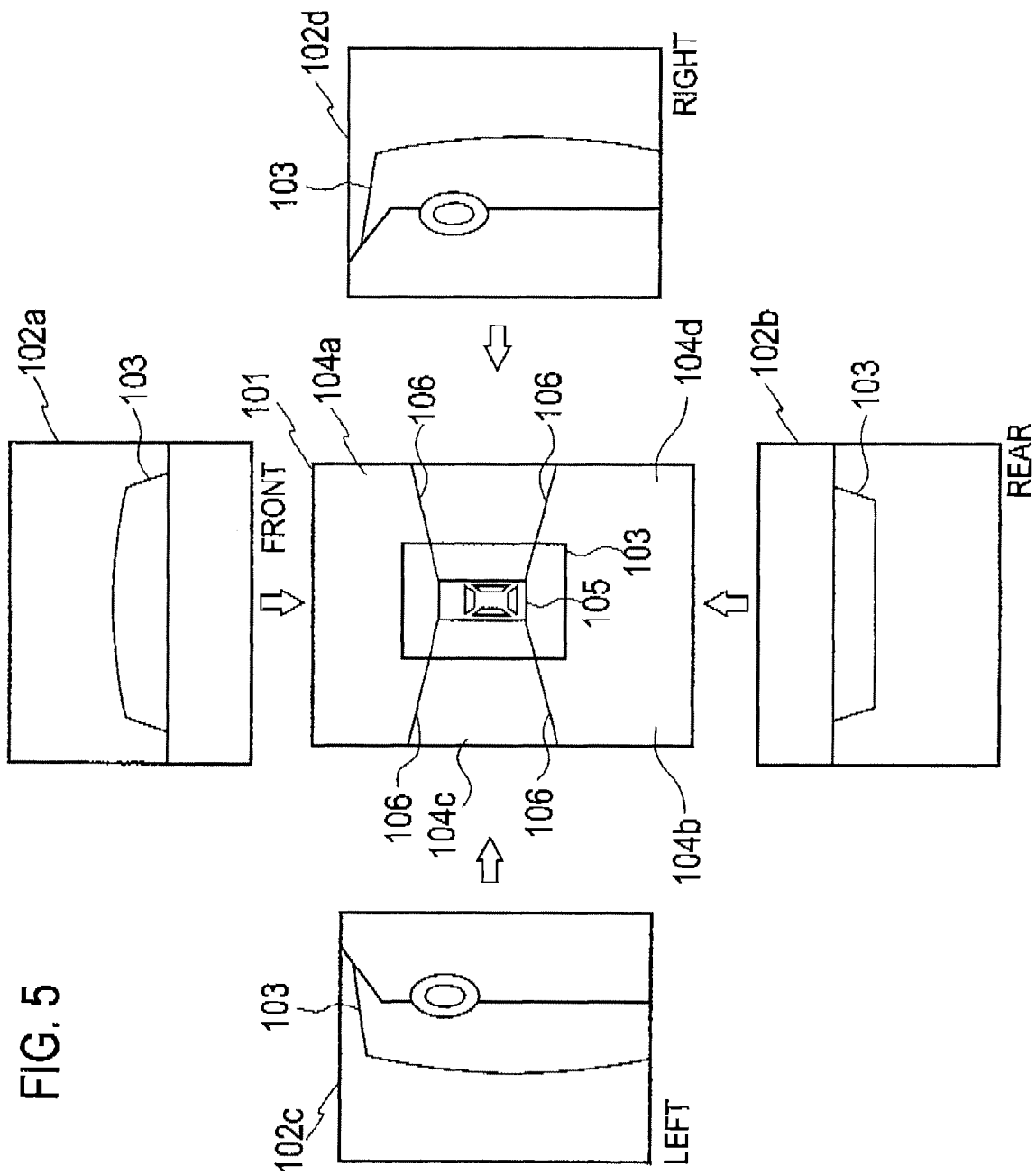
FIG. 5 explains processes for developing one piece of overhead view image from the vehicle surroundings images taken by a plurality of cameras.

The coordinate conversion for developing an overhead view image 101 is to be set forth, referring to FIG. 5. The camera 2a takes a vehicle surroundings image 102a on the front side of the vehicle while the camera 2b takes a vehicle surroundings image 102b on the rear side of the vehicle. Likewise, the camera 2c takes a vehicle surroundings image 102c on the left side of the vehicle while the camera 3d takes a vehicle surroundings image 102d on the right side of the vehicle. In the state shown in FIG. 5, a white line 103 is present on the ground in such a manner as to surround the vehicle. Therefore, each of the vehicle surroundings images 102a, 102b, 102c, 102d includes an image of the white line 103.

The image generator 21 carries out the coordinate conversion of each of the vehicle surroundings images 102a, 102b, 109c, 102d which were taken by the cameras 2a, 2b, 2c, 2d. That is, by carrying out the coordinate conversion of the vehicle surroundings image 102a on the front side of the vehicle, the image generator 21 generates a partial image 104a which is the own vehicle's front part viewed from the sky. Likewise, by carrying out the coordinate conversion of the vehicle surroundings image 102b on the rear side of the vehicle, the image generator 21 generates a partial image 104b which is the own vehicle's rear part viewed from the sky. Likewise, by carrying out the coordinate conversion of the vehicle surroundings image 102c on the left side of the vehicle, the image generator 21 generates a partial image 104c which the own vehicle's left part viewed from the sky. Likewise, by carrying out the coordinate conversion of the vehicle surroundings image 102d on the right side of the vehicle, the image generator 21 generates a partial image 104d which is the own vehicle's right part viewed from the sky. Then, by synthesizing the partial images 104a, 104b, 104c, 10d thus obtained through the coordinate conversions, the image generator 21 generates the overhead view image 101 which is the own vehicle surroundings viewed from the sky. Then, to the display 7, the image generator 21 outputs the data of the generated overhead view image 101.

To the overhead view image 101, the image generator 21 generates joint parts of the partial images 104a, 104b, 104c, 104d, that is, the joint parts are each a black joint line 106 disposed on a boundary of the adjacent partial images 104a, 104b, 104c, 104d. Then, to the display 7, the image generator 21 outputs data of the black joint line 106. In a position in the center of the overhead view image 101, the image generator 21 generates an own vehicle mark 105 denoting the own vehicle. Then, to the display 7, the image generator 21 outputs the data of the own vehicle mark 105. Hereinafter, the mark denoting the own vehicle is otherwise referred to as "own vehicle image."

In this way, the image generator 21 carries out the coordinate conversions of the vehicle surroundings images 102a, 102b, 102c, 102d taken by the camera 2, to thereby generate the partial images 104a, 104b, 104c, 104d. In addition, the image generator 21 synthesizes the partial images 104a, 104b, 104c, 104d, to thereby generate the overhead view image 101. Then, the image generator 21 generates the own vehicle mark 105, the black joint line 106, and an after-described parking target area image 203, and then, the image generator 21 outputs the generated data to the display 7 together with the data of the overhead view image 101, to thereby generate and display the display image.

With the ground as a base level and the virtual camera 32 as a viewpoint, the vehicle surroundings images obtained by the camera 2 are subjected to the viewpoint conversions, to thereby generate the overhead view image 101. As such, when a solid object is present in the vehicle surroundings image obtained with the camera 2, there occurs a phenomenon that the solid object is so displayed as to fall in a direction away from the camera 2. The longer the distance from the camera 2 to the solid object is, the larger the fall-in amount is.

Then, parking assisting operations by means of the parking assistant described above are to be set forth, referring to FIG. 6 to FIG. 11. Hereinafter, the driver intends to make a parallel parking in the right direction. The explanation is based on a state that other vehicle is already present in a parking frame adjacent (right) to the parking target. As such, according to the examples shown in FIG. 6 to FIG. 11, a display image 200 displayed on the display 7 includes the own vehicle mark 201, the joint 206, other vehicle image 205, the parking target area image 203 and a white line 204, in addition to the overhead view image.

Once the controller 1 senses that the parking button 10 is operated, the controller 1 allows the display 7 to display the display image 200. Moreover, the controller 1 displays on the display 7 a language denoting "Start parking assistance" and allows the speaker 8 to output the same language with a voice. Then, the image generator 21 of the controller 1 sets the parking target area. The parking target area image 203 denoting the parking target area is displayed in a position predetermined corresponding to the parking method selected by the parking button 10. In the example shown in FIG. 6, in the right direction and in the vicinity of the front part of the own vehicle, the parking target area image 203 is set in such a manner as to be rotated by 90° relative to the present own vehicle.

Figure 6:
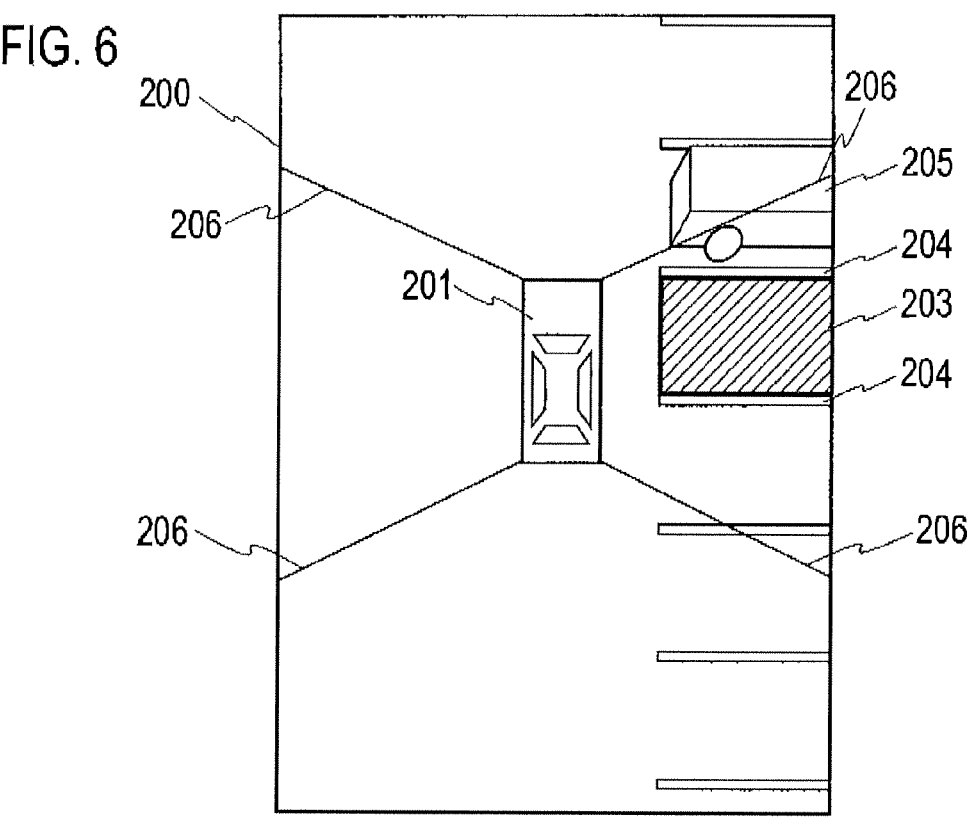
FIG. 6 shows a display image including a parking target area image displayed in the setting of a parking target area.

The parking target area image 203 has such a mode as to have a blue bold line shaped into a rectangular C and an area in the rectangular C is shaded, as is seen in FIG. 6. In the state shown in FIG. 6, the distance between the own vehicle and the parking target area is small, thereby, preventing the other vehicle image 205 from falling in to the parking target area and from superposing on the parking target area image 203. As such, the parking target area image 203 is displayed that is shaped substantially into a rectangle which is the same configuration as that of the parking frame.

Then, the image generator 21 determines the parking target area according to the operation of the driver. The controller 1 allows the display 7 to display a language saying "Move and rotate the blue parking frame to a position for parking and make the final operation." Moreover, the controller 1 allows the speaker 8 to output the same language. As such, the driver operates the scroll key 11 or the panel 11, to thereby prompt the driver to make operations for changing and determining the parking frame.

After the driver operates the scroll key 11 or the touch panel 9, the image generator 21 obtains an operation input signal for moving the parking target area image 203. According to the obtained operation input signal, the image generator 21 changes, in the display image 200, the display position of the parking target area image 203.

Then, after the driver determines the parking frame by pressing the scroll key 11, the controller 1 obtains an operation input signal for determining the position of the parking target area image 203. According to the obtained operation input signal, the controller 1 allows the display 7 to display a language saying "May this position be determined as parking target area?" and also allows the speaker 8 to output the same language.

After the driver again presses the scroll key 11, the image generator 21 obtains an operation input signal for determining, as the parking target area, a position corresponding to the parking target area image 203. According to the obtained operation input signal, the image generator 21 determines the position of the parking target area image 203. It is needless to say that, when the predetermined area 203 does not need change, the determining operation may be carried out without such changing operation.

In the determining of the parking target area, the image generator 21 obtains the parking target area image 203's coordinate information in the display image 200 and the parking target area image 203's ROB information (as color information) in the display image 200. The coordinate information and color information of the parking target area image 203 are memorized in the image generator 21, so as to be used for the after-described image processing of the parking target area image 203. The parking target area image 203's coordinate information memorized in the image generator 21 is a coordinate in the center of the parking target area image 203. The parking target area image 203's color information memorized in the image generator 21 is color information of all the coordinates in the entire area of the parking target area image 203.

Figure 7:
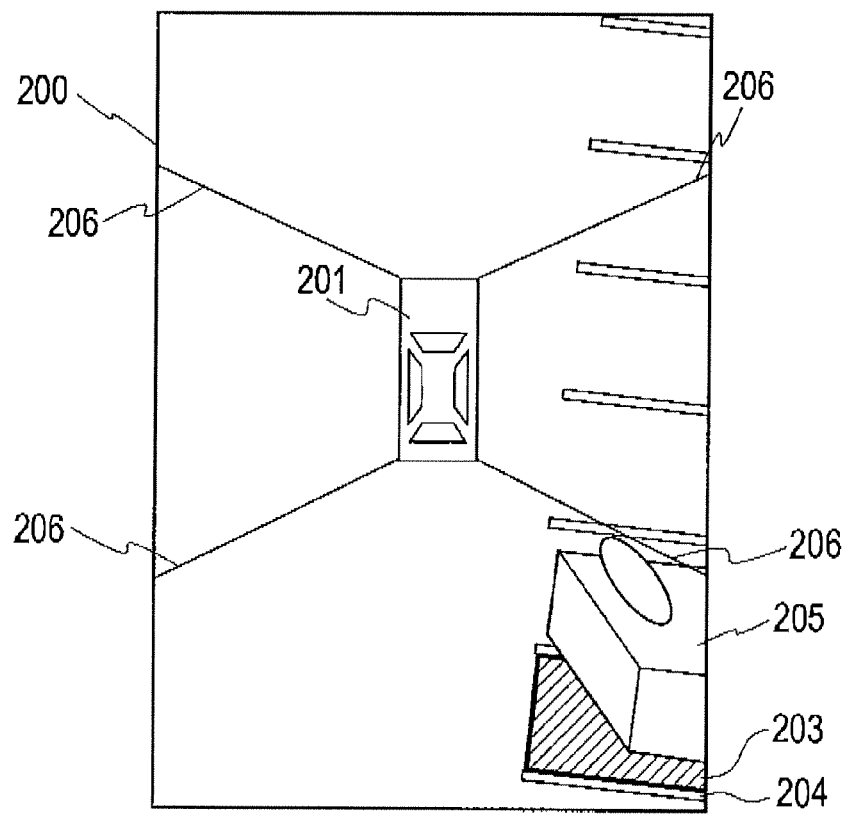
FIG. 7 shows a display image for displaying that an own vehicle is moved forward after the display image shown in FIG. 6 is displayed.

After the parking target area is determined, the own vehicle moves forward and then stops in a position for starting the rearward movement. In this case, the display image 200 displays an image as shown in FIG. 7. In the state shown in FIG. 7, the image generator 21 carries out a viewpoint conversion of the vehicle surroundings image, thereby the other vehicle image 205 has such a distorted configuration as to fall in on the parking target area image 203 side. In this fall-in state, displaying the substantially rectangular parking target area image 203 like that shown in FIG. 6 causes such a display that the parking target area image 203 covers and hides the other vehicle image 205. Therefore, the image generator 21 carries out an image processing to change the display configuration of the parking target area image 203 such that only the parking target area's second certain portion other than the parking target area's first certain portion is displayed. Hereinabove, the parking target area's first certain portion where the other vehicle image 205 is present is superposed, in the overhead view image 101, with the parking target area.

When the own vehicle moves forward from the state shown in FIG. 6 to the state shown in FIG. 7, the own vehicle's movement direction and movement amount are calculated by the movement amount calculator 22 based on the vehicle speed signal obtained by the vehicle speed sensor 4, the steering angle signal obtained by the steering angle sensor 5 and the shift position signal obtained by the shift position sensor 6, and are supplied to the image generator 21 as movement amount information. The image generator 21 reads out the parking target area image 203's coordinate information and color information which were memorized in the determining of the parking target area.

Then, based on the memorized coordinate information of the parking target area and the movement amount information supplied from the movement amount calculator 22, the image generator 21 calculates the parking target area relative to the own vehicle's present position. Then, based on the parking target area relative to the own vehicle's present position, the image generator 21 calculates the present parking target area image 203's occupying area on the display image 200.

For example, it is defined that the center coordinate of the parking target area on the display image 200 in the determining of the parking target area is (Xr, Yr), the direction of the parking target area relative to the own vehicle in the determining of the parking target area is θr, the own vehicle's movement amount calculated by the movement amount calculator 22 is (+Δx, +Δy), and a change angle of the direction of the own vehicle is +Δθ. In this case, the center coordinate of the parking target area after the own vehicle is moved is displaced by (X−Δx, Y−Δy) and the direction of the parking target area is rotated by (θ−Δθ). As such, the image generator 21 can seek for the parking target area image 203's occupying area on the display image 200 after the own vehicle is moved.

Then, the image generator 21 obtains the color information (in the display image 200's occupying area) which corresponds to the present parking target area image 203. The image generator 21 compares the display image 200's color information which corresponds to the obtained present parking target area image 203, with the display image 200's color information (obtained in the determining of the parking area) which corresponds to the parking target area image 203. After the comparison, on the image (pixel) where the above two pieces of color information are determined to be equivalent, the image generator 21 superpose the parking target area image 203. Meanwhile, on the image (pixel) where the above two pieces of color information are determined to be not equivalent, the image generator 21 develops the display image 200 after the parking target area image 203 is so moved to prevent the superposition. As such, as shown in FIG. 7, even the viewpoint conversion causes a configuration that the other vehicle image 205 falls in, the image generator 21 displays the parking target area 203 in the parking target area's second certain portion other than the parking target area's first certain portion where the other vehicle image 205 is present is superposed, in the overhead view image 101, with the parking target area.

Figure 8:
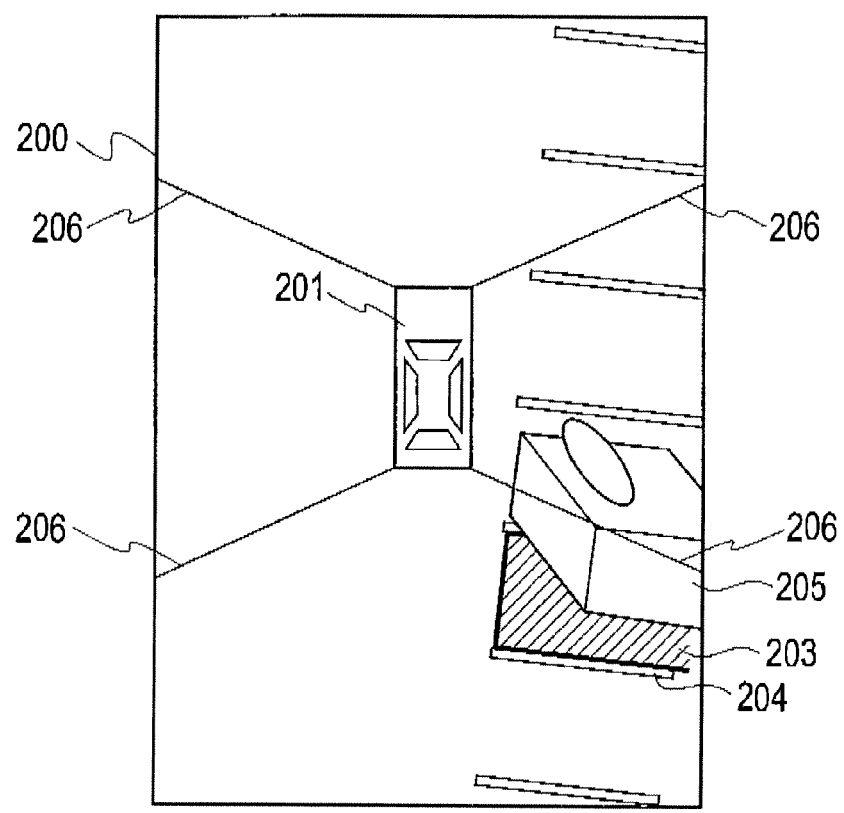
FIG. 8 shows a display image for displaying that the own vehicle is moved rearward after the display image shown in FIG. 7 is displayed.

Then, the own vehicle moves toward the parking target area from the state shown in FIG. 7 to the state shown in FIG. 8. In this case, the shorter the distance between the own vehicle image 201 and the other vehicle image 205 as a solid object is, the smaller the amount of the other vehicle image 205's fall-in to the parking target area image 203 is. That is, the shorter the distance between the own vehicle and each of the other vehicle and the parking target area is, the less the other vehicle's distortion by the viewpoint conversion is, thereby the less the area where the other vehicle image 205 is superposed with the parking target area image 203 is. Specifically, the area size of the parking target area image 203 shown in FIG. 8 is larger than the area size of the parking target area image 203 shown in FIG. 7.

Figure 9:
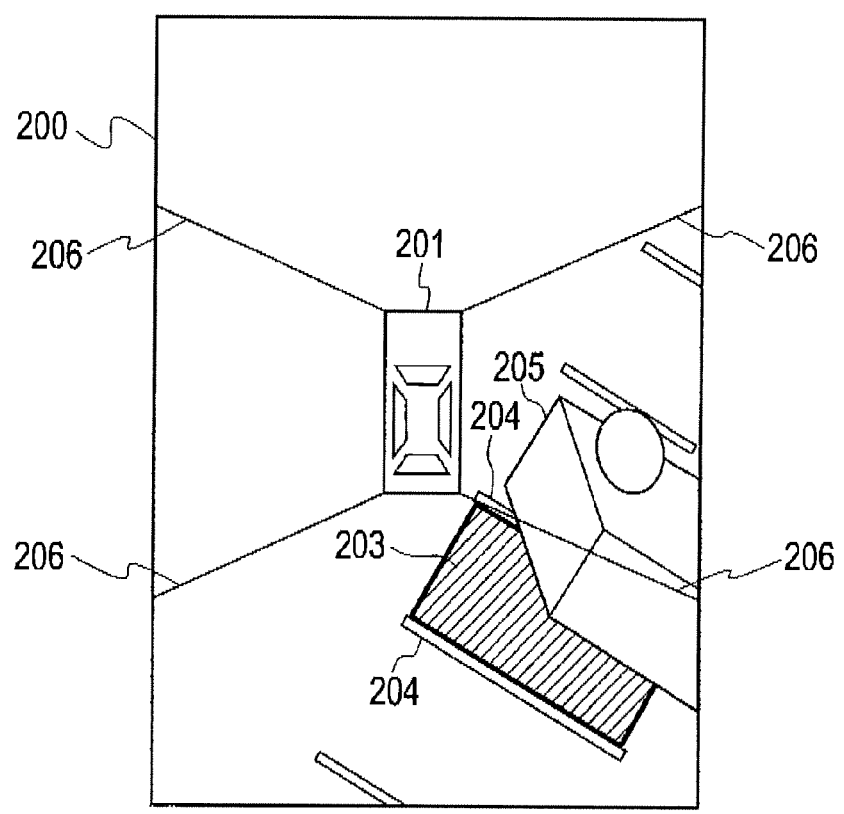
FIG. 9 shows a display image for displaying that the own vehicle is moved rearward after the display image shown in FIG. 8 is displayed.
Figure 10:
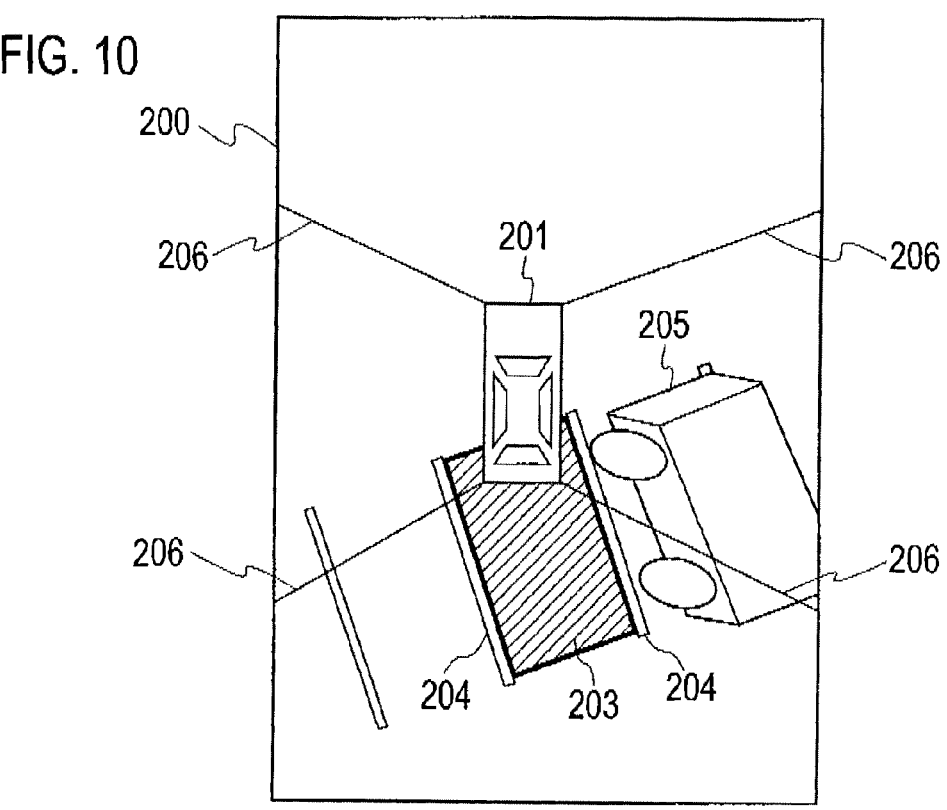
FIG. 10 shows a display image for displaying that the own vehicle is moved rearward and enters the parking target area after the display image shown in FIG. 9 is displayed.
Figure 11:
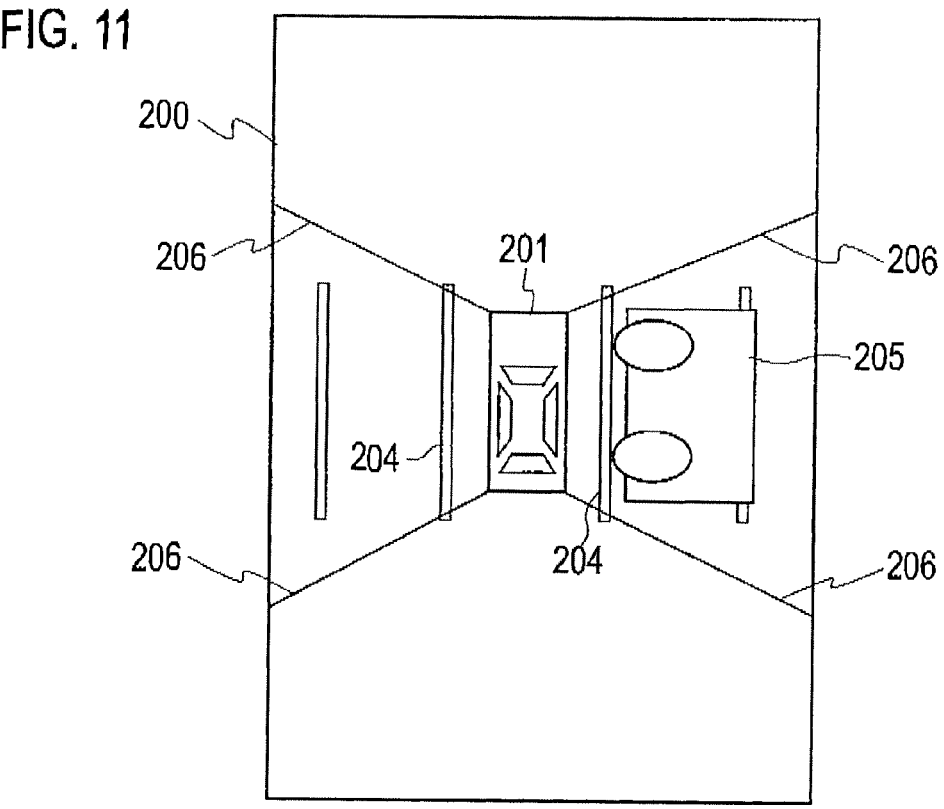
FIG. 11 shows a display image for displaying that the own vehicle is moved rearward and reaches the parking target area after the display image shown in FIG. 10 is displayed.

Then, at every certain time when the own vehicle moves rearward, the image generator 21 generates the parking target area image 203 in the parking target area's second certain portion other than the parking target area's first certain portion where the other vehicle image 205 is present is superposed, in the overhead view image 101, with the parking target area, as stated above, to hereby renew the display image 200. Specifically, when the own vehicle moves rearward toward the parking target area from the state shown in FIG. 8 to the state shown in FIG. 9, the area where the other vehicle image 205 falls in the parking target area image 203 is further decreased. Moreover, when the own vehicle enters the parking target area, as shown in FIG. 10, the area where the other vehicle image 205 falls in to the parking target image 203 is none, thus displaying the parking target area image 203 which shows the entire parking target area. Moreover, when the own vehicle is positioned substantially in the center of the parking target area, that is, when the own vehicle reaches the parking target area, as shown in FIG. 11, the image generator 21 prevents the parking target area image 203 from being displayed in the display image 200, to thereby inform the driver that the parking operation is completed.

Figure 12:
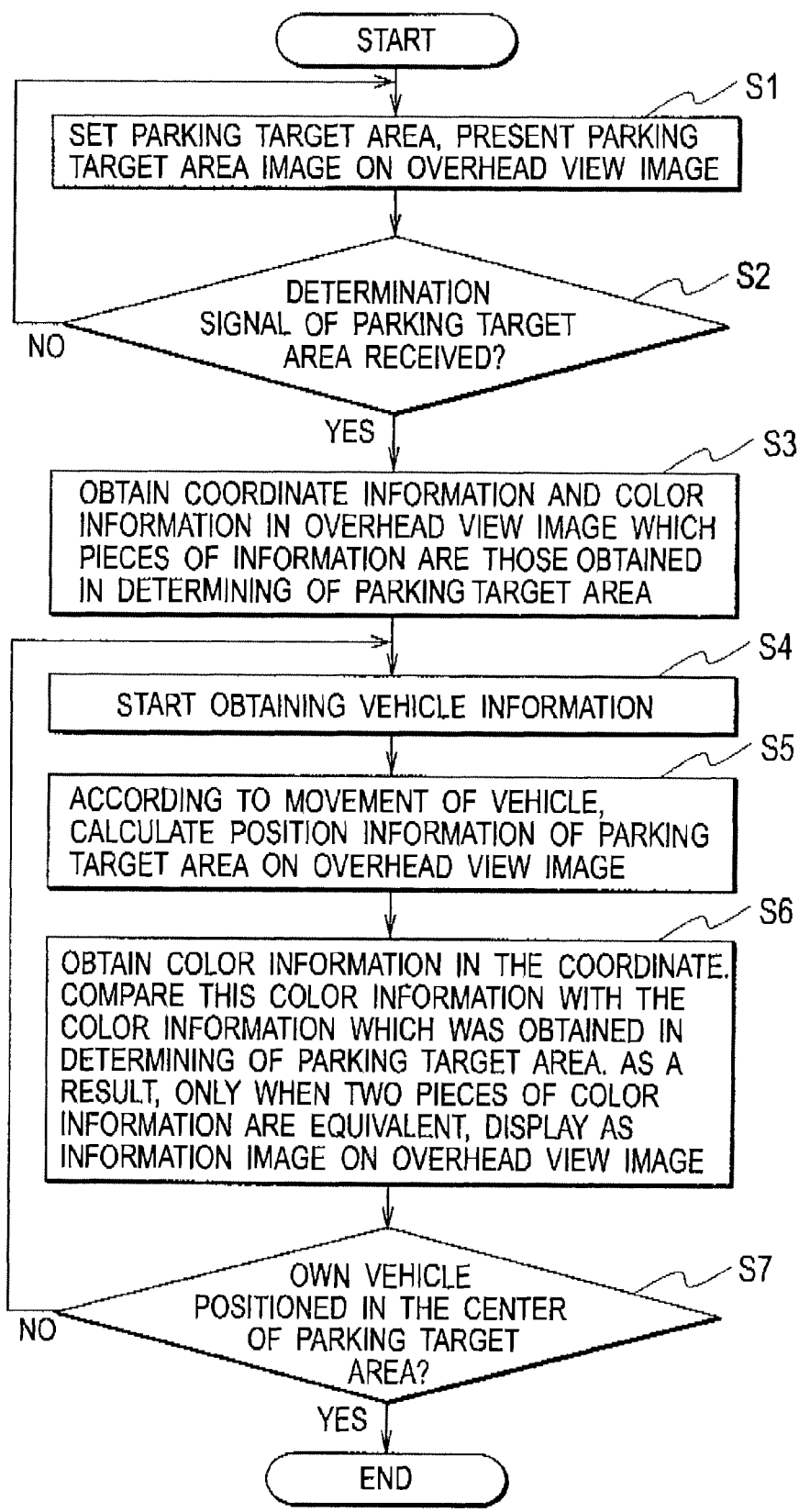
FIG. 12 is a flowchart for explaining parking assisting operations for displaying the display image with the parking target area image's display configuration changed.

Then, the parking assistant's processing flow when presenting the above described display image 200 to the driver is to be set forth, referring to a flowchart shown in FIG. 12. In the flowchart shown in FIG. 12, the driver operates the parking button 10, the controller 1 inputs an operation input signal for starting the parking assistance, and thereby the process proceeds to the step S1.

In the process of step S1, the controller 1 allows the image generator 21 to set the parking target area, to thereby allow the display 7 to display the display image 200 which is made by superposing the parking target area image 203 on the overhead view image as shown in FIG. 4. The image generator 21 determines the parking target area after the driver changes the predetermined parking target area. In this process, when the parking frame is positioned relative to the own vehicle, as shown in FIG. 8, that is, when the other vehicle image 205 falls in to the parking target area, such an image processing is necessary as to process the configuration of the parking target area image 203 so as to make the parking target area's second certain portion other than the parking target area's first certain portion where the other vehicle image 205 is present is superposed, in the overhead view image 101, with the parking target area.

In this case, at first, the image generator obtains the color information of the entire overhead view image. Then, based on the obtained color information, the image generator 21 generates the parking target area image 203 which shows the parking target area's second certain portion other than the parking target area's first certain portion where a solid object such as the other vehicle image 205 is present is superposed, in the overhead view image 101, with the parking target area. That is, when the obtained pixel's color information shows the ground level or white line, the image generator 21 determines that the solid object does not fall in the pixel and thereby the pixel can be displayed as the parking target area image 203. On the other hand, when the pixel's color information does not show the ground level or white line, the image generator 21 determines that the solid object falls in the pixel and thereby the pixel cannot be displayed as the parking target area image 203. Then, based on the determination results, the image generator 21 generates the parking target area image 203.

Even when the image data in the overhead view image superposed with the parking target area image 203 in the past was not memorized, the above generating of the parking target area image 203 can bring about the following effect. The parking target area image 203 having a configuration which prevents the falling-in of the solid object can be superposed on the overhead view image.

In the process at step S2, the controller 1 determines whether or not the operation input signal for determining the parking target area is inputted by way of the scroll key 11. When the operation input signal for determining the parking target area is inputted, the controller 1 moves the process to the step S3. On the other hand, when the operation input signal for determining the parking target area is not inputted, the controller 1 again sets the parking target area by the process at step S1.

In the process at step S3, the image generator 21 memorizes the overhead view image's color information corresponding to the parking target area image 203 which color information is obtained in the determining of the parking target area, and the parking target area image 203's coordinate information (in the overhead view image) which is obtained in the determining of the parking target area. The parking target area image 203's coordinate information and color information each serve as information to be referenced in the after-described image processing.

In the process at step S4, the image generator 21 inputs the movement amount information calculated by the movement amount calculator 22.

In the process at step S5, based on the memorized coordinate information and the movement amount information, the image generator 21 calculates the position of the parking target area image 203. Then, the image generator 21 obtains the color information in the calculated position of the parking target area image 203.

In the process at step S6, the image generator 21 compares the color information of the parking target area image 203 (that is, the color information obtained in the determining of the parking target area and memorized in the process at step S3), with the color information in the position of the parking target area image 203 (that is, the color information obtained in the process at step S5). In this case, the image generator 21 compares the above pieces of color information per pixel or per a plurality of pixel blocks. Then, the image generator 201 superpose the parking target area image 203 only to an area that has the above pieces of color information substantially equivalent to each other. In this way, based on the color information, the image generator 21 processes the configuration of the parking target area image 203, thereby carry out the image processing which generates the parking target area image 203's configuration displaying the parking target area's second certain portion other than the parking target area's first certain portion where the other vehicle image 205 is present is superposed, in the overhead view image 101, with the parking target area.

In the process at step S7, the image generator 21 determines whether or not the own vehicle image 201 is positioned in the center of the parking target area image 203 (that is, the center is the position calculated in the process at step S5). In this case, by using the parking target area image 203's coordinate information calculated in the process at step S5 and the own vehicle image 201's coordinate information, the image generator 21 makes the above determination. As a result of determination, for example, as shown in FIG. 9, when the own vehicle image 201 is not positioned in the center of the parking target area image 203, the image generator 21 returns the process to the step S4. On the other hand, for example, as shown in FIG. 11, when the own vehicle image 201 is positioned in the center of the parking target area image 203, the image generator 21 determines that the parking is completed and ends the processing. With the display or voice, the controller 1 can make an announcement that the own vehicle reaches the parking target area, as shown in FIG. 11.

As set forth in detail above, according to the first embodiment, when the other vehicle image 205 in the overhead view image generated by the viewpoint conversion falls in to the parking target area image 203, the image generator 21 generates the parking target area image 203 which displays the parking target area's second certain portion other than the parking target area's first certain portion where the solid object is present is superposed, in the overhead view image 101, with the parking target area. With this, the state that the parking target area image 203 covers and hides the other vehicle image 205 as a result of the superposing of the parking target area image 203 on the overhead view image can be prevented, to thereby allow the driver to accurately recognize the parking target area image 203 set in the parking frame, according to the first embodiment.

According to the first embodiment, based on the color information of the parking target area image 203, the image generator 21 can generate the parking target area image 203 which displays the parking target area's second certain portion other than the parking target area's first certain portion where the solid object is present is superposed, in the overhead view image 101, with the parking target area. With this, the parking target area image 203 for displaying the parking target area's second certain portion other than the parking target area's first certain portion where the solid object is present is superposed, in the overhead view image 101, with the parking target area. With this, the parking target area image 203 for displaying the parking target area's second certain portion other than the parking target area's first certain portion can be generated, without the need of calculating a complicated image.

According to the first embodiment, the image generator 21 determines the parking target area after the driver changes the predetermined parking target area. With this, the parking target area desired by the driver can be determined, to thereby allow the driver to park the own vehicle according to the own vehicle's state.

Second Embodiment

Then, the parking assistant to which the present invention is applied is to be set forth, according to a second embodiment. Hereinafter, parts or portions substantially similar to those according to the first embodiment are to be denoted by the same numerals or signs and therefore detailed explanations thereof are to be omitted. With the parking assistant according to the second embodiment, the partial area where any obstacle is not sensed is set as a parking target area. That is, with the parking assistant according to the first embodiment, the predetermined parking target area is set; while with the parking assistant according to the second embodiment, the parking target area is set based on the obstacle sensing state by the ultrasonic wave sensor 3.

With the parking assistant according to the second embodiment, based on the obstacle position information outputted from the ultrasonic wave sensor 3, the image generator 21 carries out a processing for setting the parking target area. That is, at first, based on the obstacle position information, the image generator 21 determines whether or not a space area is present that has an inner length and a width which allow parking of the own vehicle. In the case that the parkable space area is present, the image generator 21 sets the center position of the space area as a center position of the parking target area. In the case that the parking target area is set based on the obstacle position information, the ultrasonic wave sensor 3 includes a group having at least two ultrasonic wave sensors disposed at right and left ends of the vehicle.

With this, based on the obstacle position information obtained when the own vehicle passes by in front of the space area, the image generator 21 can determine the space area, to thereby set the parking target area. Then, based on the obstacle position information of the ultrasonic wave sensor 3, the image generator 21 sets the parking target area, in the process at step S1 in FIG. 12 mentioned above. Then, the image generator 21 allows the display 7 to display the display image 200 which is developed by superposing the parking target area image 203 on the overhead view image, as shown in FIG. 6.

In the case that the setting of the parking target area based on the obstacle position information senses a plurality of space areas, the image generator 21 sets, as the parking target area, the space area that is closest to the own vehicle. Then, the image generator 21 displays the display image 200 which is developed by superposing the parking target area image 203 on the overhead view image. In this case, based on the own vehicle's position relative to the space area closest to the own vehicle and based on the own vehicle's moveable scope memorized in advance, the image generator 21 sets the parking target area in the space area where the own vehicle is packable.

As set forth in detail above, according to the second embodiment, the space free of the obstacle including the other vehicle can be set as the parking target area. With this, in addition to the effect brought about according to the first embodiment, merely allowing the vehicle to pass in the vicinity of the space free of the obstacle can set the parking target area, according to the second embodiment.

Third Embodiment

Then, the parking assistant to which the present invention is applied is to be set forth, according to a third embodiment. Hereinafter, parts or portions substantially similar to those according to the first and second embodiments are to be denoted by the same numerals or signs and therefore detailed explanations thereof are to be omitted. With the parking assistant according to the third embodiment, the vehicle surroundings image taken by the camera 2 recognizes the white line, then, based on the image information between the recognized white lines, the parking target area is to be set. The white line recognition processing is carried out by the image generator 21.

With the parking assistant according to the third embodiment, the image generator 21 recognizes the white line, to thereby carry out the process of setting the parking target area. That is, at first, by using the vehicle surroundings image outputted from the camera 2, the image generator 21 generates the overhead view image, then senses edges of the overhead view image, to thereby sense the white line 204. Then, the image generator 21 compares the color information of the image area between the white lines 204 with the color information of the ground image close to the own vehicle, to thereby sense the space area.

For example, the image area where the other vehicle image 205 is present between the white lines 204 becomes color information which is different from the ground image close to the own vehicle. On the other hand, the image area where the space area is present between the white lines 204 becomes color information which is the same as the ground image close to the own vehicle. The image generator 21, even not using the color information, may sense the space area by sensing the edge of the image data between the sensed white lines 204. After the edge sensing, many edges are sensed in the image area which includes the other vehicle image 205 between the white lines 204, while few edges are sensed in the image area which includes the space area between the white lines 204. By using the above, the image generator 21 can determine whether or not the area between the white lines 204 is the space area and whether or not the other vehicle is present between the white lines 204.

As set forth above, based on the color information between the white lines 204 or based on a result of sensing the edge between the white lines 204, the image generator 21 can set the parking target area. Then, in the process at step S1 in FIG. 12 described above, the image generator 21 sets the parking target area based on the image information between the recognized white lines. Then, as shown in FIG. 6 and the like, the image generator 21 allows the display 7 to display the display image 200 which is developed by superposing the parking target area image 203 on the overhead view image.

In the case that the setting of the parking target area by recognizing the white line 204 senses a plurality of space areas, the image generator 21 sets, as the parking target area, the space area that is closest to the own vehicle. Then, the image generator 21 displays the display image 200 which is developed by superposing the parking target area image 203 on the overhead view image. In this case, based on the own vehicle's position relative to the space area closest to the own vehicle and based on the own vehicle's moveable scope memorized in advance, the image generator 21 sets the parking target area in the space area where the own vehicle is parkable.

As set forth in detail above, according to the third embodiment, the parking target area is set based on the image information between the white lines. With this, in addition to the effect brought about according to the first embodiment, merely allowing the vehicle to pass in the vicinity of the space where the white line is drawn can set the parking target area, according to the third embodiment.

Fourth Embodiment

Then, the parking assistant to which the present invention is applied is to be set forth, according to a fourth embodiment. Hereinafter, parts or portions substantially similar to those according to the first to third embodiments are to be denoted by the same numerals or signs and therefore detailed explanations thereof are to be omitted. With the parking assistant according to the fourth embodiment, in the case that the rearward movement of the vehicle is sensed when the display image 200 where the parking target area image 203 is superposed on the overhead view image is displayed, the vehicle's ideal line from the vehicle position to the parking target area and an estimated track line based on the vehicle's steering angle are, as an information image, superposed on the overhead view image. With this, the parking assistant assists the driver to move the own vehicle rearward and lead the own vehicle to the parking target area.

Figure 13:
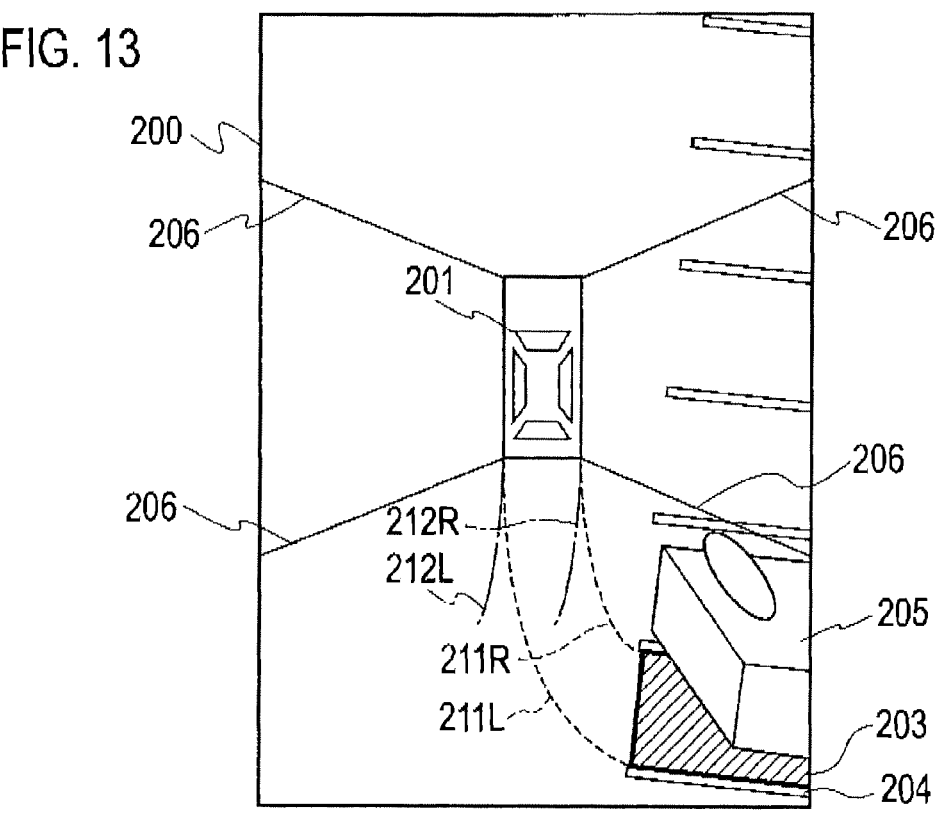
FIG. 13 shows a display image made by superposing the own vehicle's estimated track lines and ideal track lines on the overhead view image.

That is, according to the fourth embodiment, when the shift position signal outputted from the shift position sensor 6 is rendered R (reverse), that is, with the above operation as a trigger, the estimated track calculator 23 displays the ideal track line and the estimated track line. Specifically, the estimated track calculator 23, as shown in FIG. 13, allows the display 7 to display the display image 200 where the ideal track lines 211R, 211L and the estimated track lines 212R, 212L are superposed on the overhead view image. In this case, based on the tire turning angle obtained by the signals, that is, the shift position signal obtained by the shift position sensor 6 and the steering angle signal obtained by the steering angle sensor 5, the estimated track calculator 23 calculates the estimated track information denoting the own vehicle's physical moveable area, to thereby supply the estimated track information to the image generator 21.

The ideal track lines 211R, 211L can be obtained from the vehicle's present position relative to the parking target area. The ideal track lines 211R, 211L are such tracks that the own vehicle reaches the parking target area when the own vehicle moves rearward in a state that the tire turning angle, that is, the steering wheel angle is kept constant. From the right and left ends on the rear portion of the own vehicle image 201, the ideal track lines 211R, 211L are connected to the right and left ends of the parking target area image 203 and are drawn on the overhead view image.

When the other vehicle image 205 falls in the parking target area image 203 and thereby the ideal track lines 211R, 211L connected to the right or left ends of the parking target area image 203 are superposed with the other vehicle image 205, the image generator 21 prevents the ideal track lines 211R, 211L from being drawn in the portion where the other vehicle image 205 is falling in. Likewise, when the other vehicle image 205 falls in the parking target area image 203 and thereby the estimated track lines 212R, 212L are superposed with the other vehicle image 205, the image generator 21 prevents the estimated track lines 212R, 212L from being drawn in the portion where the other vehicle image 205 is falling in.

With this, the parking assistant allows the driver to make such a steering wheel operation as to superpose the estimated track lines 212R, 2121, on the ideal track lines 211R, 211L, to thereby lead the own vehicle to the parking target area. In this case, the image generator 21 allows the display 7 to display such a language as to read, for example, "With the vehicle stopped, turn the steering wheel and allow the blue line to mate with the red line. Then, move the vehicle rearward with the steering wheel kept fixed." Moreover, the image generator 21 informs the driver of the same language from the speaker 8 with a voice.

The movement amount calculator 22 senses the vehicle's movement along the ideal track lines 211R, 211L. Based on the movement amount information calculated by the movement amount calculator 22, the image generator 21 renews the position where the parking target area image 203 is superposed on the overhead view image. Moreover, the image generator 21 so process the surface configuration of the parking target area image 203 as to prevent the other vehicle image 205, to thereby renew the display image 200.

As set forth in detail above, according to the fourth embodiment, the ideal track lines 211R, 2111, and the estimated track lines 2128, 212L are superposed on the overhead view image. With this, in addition to the effect brought about according to the first embodiment, the driver can recognize the parking target area image 203 on the overhead view image and thereby the driving operation to move the own vehicle to the parking target area can be assisted, according to the fourth embodiment.

Fifth Embodiment

Then, the parking assistant to which the present invention is applied is to be set forth, according to a fifth embodiment. Hereinafter, parts or portions substantially similar to those according to the first to fourth embodiments are to be denoted by the same numerals or signs and therefore detailed explanations thereof are to be omitted. With the parking assistant according to the fifth embodiment, an information providing area is set outside an overhead view image, to thereby allow a parking target area outside the overhead view image to be displayed in such a manner as to be superposed on the information providing area. For example, when the vehicle moves in a direction away from the parking target area image 203 from the state shown in FIG. 7, most parts of the parking target area image 203 are disposed outside the overhead view image, as shown in FIG. 14, thereby the parking target area image 203 displayed in the display image 200 becomes so small.

Figure 14:
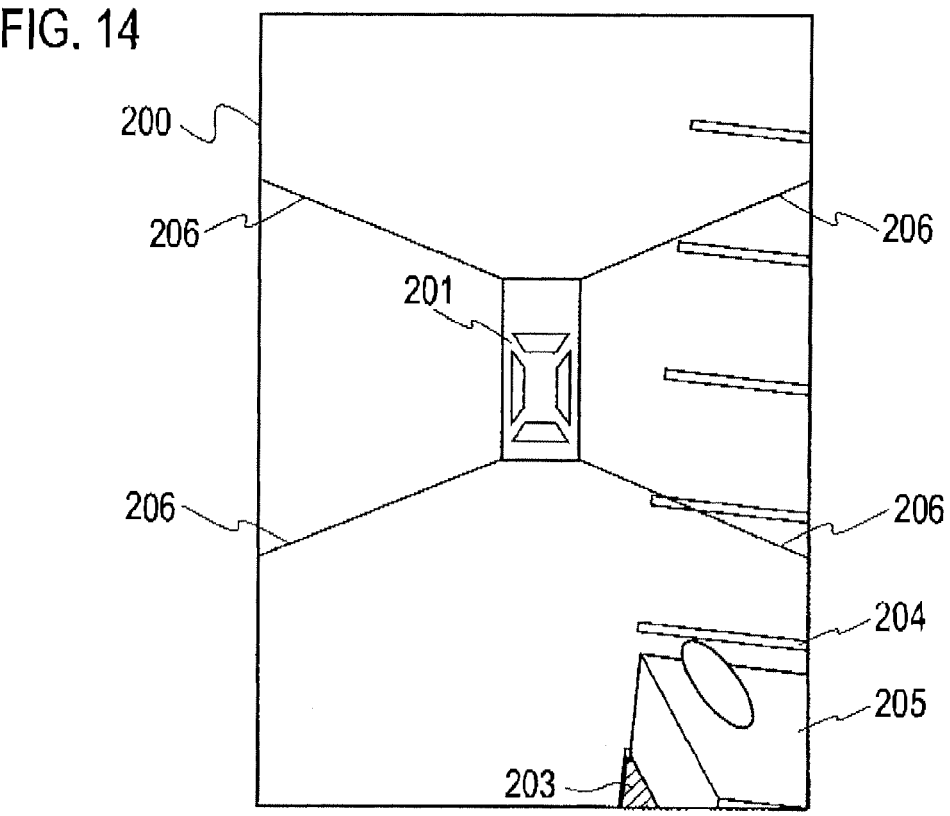
FIG. 14 is shows a display image where the parking target area image is outside the overhead view image from a relative position between the own vehicle and the parking target area.
Figure 15:
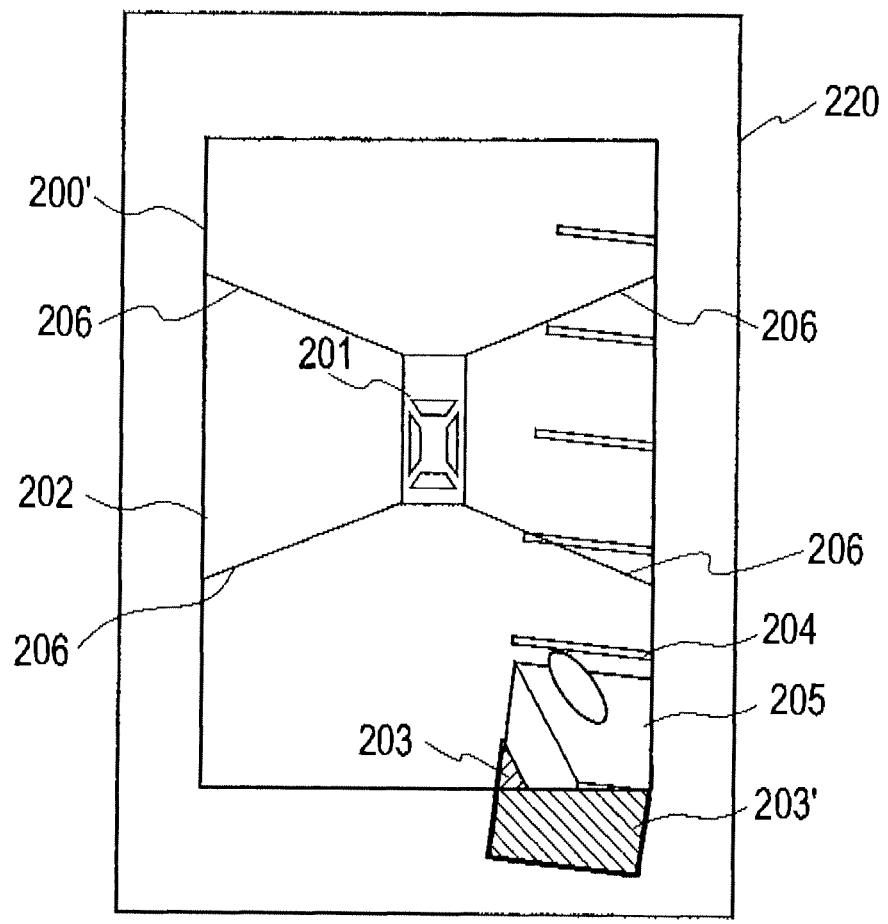
FIG. 15 shows a display image for displaying the parking target area image by setting an information providing area outside the overhead view image.

As such, with the parking assistant according to the fifth embodiment, as shown in FIG. 15, an information providing area 220 is set outside an overhead view image 200'. Then, the parking assistant develops the display image 200 including the parking target area image 203 in the overhead view image 200' and a parking target area image 203' on the information providing area 220. With this, the parking assistant develops the display image 200 that includes the parking target area image larger in area than the parking target area image 203 in the display image 200 shown in FIG. 14. When the vehicle moves from a first state showing the own vehicle image 201 relative to the parking target area image 203 as shown in FIG.

7 to a second state showing the own vehicle image 201 relative to the parking target area image 203 as shown in FIG. 14, the information providing area 220 may be so set as to display the parking target area image 203.

That is, according to the fifth embodiment, based on the relative position between the own vehicle and the parking target area, the image generator 21 determines whether or not the parking target area image 203 is outside the display image 200. As a result of the determination, when the parking target area image 203 is outside the display image 200, the image generator 21 develops the display image 200 where the information providing area 220 is disposed outside the overhead view image 200'. With this, the image generator 21 allows the display 7 to display the display image 200 where the parking target area image 203 is superposed throughout the overhead view image 200' and the information providing area 220.

Based on the own vehicle's movement amount information calculated by the movement amount calculator 22, the image generator 21 calculates the parking target area's coordinate in the overhead view image 200'. Even when the parking target area image 203 is disposed outside the overhead view image 200' as a result of the coordinate calculation, the image generator 21 sets the information providing area 220 outside the overhead view image 200'. As such, even when the relative position (calculated from the movement amount information outputted from the movement amount calculator 22) between the present own vehicle and the parking target area is outside the overhead view image 200', the image generator 21 needs to keep the relative position. Then, when the parking target area image 203 is disposed on the overhead view image 200', the image generator 21 changes the display configuration of the parking target area image 203 according to the falling-in of the other vehicle image 205, to thereby superpose the parking target area image 203 on the overhead view image 200'. On the other hand, when the parking target area image 203 is not disposed on the overhead view image 200', the image generator 21 disposes the information providing area 220 outside the overhead view image 200', to thereby display, on the information providing area 220, the display image 200 including the parking target area image 203' which is a part of the parking target area image 203.

As set forth in detail above, according to the fifth embodiment, the information providing area 220 is disposed outside the overhead view image 200' to thereby display the parking target area image 203. With this, in addition to the effect brought about according to the first embodiment, even when the parking target area image 203 is disposed outside a display scope from the relative position between the own vehicle and the parking target area, the parking target area image 203 can be supplied to the driver, according to the fifth embodiment.

According to the first to fifth embodiments set forth above, although the coordinate information of the parking target area image 203 is the coordinate of the center position, coordinates at four apexes of the parking target area image 203 or coordinates of only two points (among the apexes) in the direction of the own vehicle image 201 are allowed. Although, as the color information, the color information of all the coordinates of the parking target area image 203 are obtained, a specific pixel may be used as a representative or mean value is also allowed. Although the RGB information is used as the color information, a YCbCr information is also allowed.

The camera 2 is a camera, the controller 1 and the image generator 21 are included in an overhead view image generator, the controller 1, the image generator 21, the parking button 100, the touch panel 9, the scroll key 11 and the ultrasonic wave sensor 3 are included in a parking target area setter. The controller 1 and the image generator 21 are included in a parking target area image generator. The movement amount calculator 22 is included in a movement sensor. The ultrasonic wave sensor 3 is included in an obstacle sensor. The display 7 is included in a display. The shift position sensor 6 and the controller 1 are included in a rearward movement sensor. The vehicle speed sensor 4, the steering angle sensor 5, the controller 1 and the estimated track calculator 23 are included in a track generator.

The above embodiments are each an example of the present invention. The present invention is not limited to the above embodiments. It is a matter of course that, various changes are allowed other than the above embodiments, according to design and the like, within the scope not beyond the technical concept of the present invention.

INDUSTRIAL APPLICABILITY

The present invention is applicable to the process of assisting the driver to park the own vehicle in the target position.

The invention claimed is:
1. A parking assistant, comprising:
a camera for taking a vehicle surroundings image comprising color information;
an overhead view image generator for generating, with a viewpoint conversion, an overhead view image from the vehicle surroundings image taken by the camera;
a parking target area setter for setting a parking target area in the overhead view image generated by the overhead view image generator;
a parking target area image generator for generating a parking target area image when a first certain portion of the parking target area is superposed by a solid object present in the overhead view image, the parking target area image being newly generated as a second certain portion of the parking target area other than the superposed first certain portion;
a display for displaying the overhead view image generated by the overhead view image generator and displaying the parking target area image newly generated by the parking target area image generator; and
a movement sensor for sensing a movement direction of a vehicle and a movement amount of the vehicle, wherein
based on the movement direction and the movement amount of the vehicle which are sensed by the movement sensor, the overhead view image generator generates the overhead view image where a position of the parking target area in the overhead view image is renewed, and
wherein the parking target area image generator compares:
the color information of the parking target area in the overhead view image, where the color information is obtained when the parking target area is set by the parking target area setter,
with
the color information of the renewed parking target area, where the color information is obtained when the position of the parking target area is renewed,
sets a new parking target area on the overhead view image where the above two pieces of color information are determined substantially equivalent,
sets no new parking target area on the overhead view image where the above two pieces of color information are determined not substantially equivalent,
to thereby newly generate the parking target area image in the second certain portion other than the superposed first certain portion.

2. The parking assistant according to claim 1, wherein
the parking target area setter includes an operator for allowing a driver to input a position in the overhead view image, and
based on the position in the overhead view image which position inputted by the operator, the parking target area setter sets the parking target area.

3. The parking assistant according to claim 1, further comprising:
an obstacle sensor for sensing a position of the solid object which is present around the vehicle,
wherein
the parking target area setter sets, as the parking target area, an area where the solid object is not sensed by the obstacle sensor.

4. The parking assistant according to claim 1, further comprising:
an image recognizer for recognizing a white line included in the vehicle surroundings image taken by the camera,
wherein
based on image information between the white lines recognized by the image recognizer, the parking target area setter sets the parking target area.

5. The parking assistant according to claim 1, further comprising:
a rearward movement sensor for sensing a rearward movement of the vehicle, and
a track generator for generating:
an ideal track line of the vehicle, the ideal track line being from a position of the vehicle to the parking target area, and
an estimated track line based on a steering angle of the vehicle,
wherein
when the rearward movement sensor senses the rearward movement of the vehicle, the display displays the ideal track line and the estimated track line which are generated by the track generator.

6. The parking assistant according to claim 1, wherein
the display includes an information providing area outside a display area of the overhead view image, and
in the information providing area, the display displays a parking target area outside the overhead view image.

7. The parking assistant according to claim 1, wherein
when the parking target area obtained based on the movement direction and movement amount of the vehicle which are sensed by the movement sensor is outside the overhead view image, the display provides an information providing area outside the overhead view image.

8. A parking assisting method, comprising:
setting a parking target area, in an overhead view image comprising color information generated from a vehicle surroundings image with a viewpoint conversion;
generating a parking target area image when a first certain portion of the parking target area is superposed by a solid object present in the overhead view image, the parking target area image being newly generated as a second certain portion of the parking target area other than the superposed first certain portion; and
displaying the overhead view image and the newly generated parking target area image, wherein the method further comprises:
sensing a movement direction of a vehicle and a movement amount of the vehicle, wherein
based on the movement direction and the movement amount of the vehicle which are sensed, generating the overhead view image where a position of the parking target area in the overhead view image is renewed, and
comparing:
the color information of the parking target area in the overhead view image, where the color information is obtained when the parking target area is set, with
the color information of the renewed parking target area, where the color information is obtained when the position of the parking target area is renewed;
setting a new parking target area on the overhead view image where the above two pieces of color information are determined substantially equivalent; and
setting no new parking target area on the overhead view image where the above two pieces of color information are determined not substantially equivalent,
to thereby newly generate the parking target area image in the second certain portion other than the superimposed first certain portion.

* * * * *